Nov. 22, 1960    R F. NAIRN    2,961,332
PROCESS FOR PRODUCING DECORATIVE FOAM SURFACE COVERINGS
Filed July 21, 1959
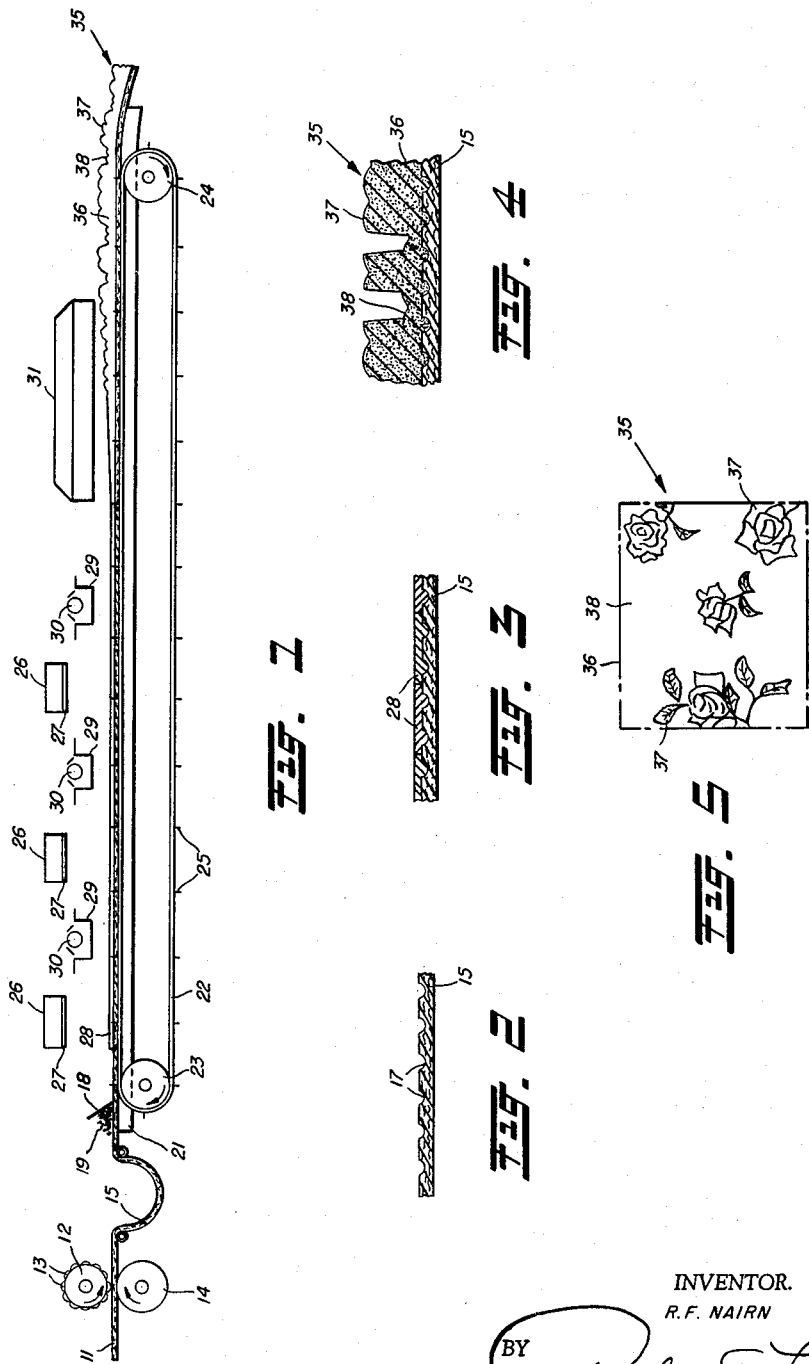
INVENTOR.
R.F. NAIRN
BY
ATTORNEY

United States Patent Office 2,961,332
Patented Nov. 22, 1960

2,961,332

PROCESS FOR PRODUCING DECORATIVE FOAM SURFACE COVERINGS

R Frank Nairn, Kennett Square, Pa., assignor to Congoleum-Nairn Inc., Kearny, N.J., a corporation of New York Filed July 21, 1959, Ser. No. 828,661

16 Claims. (Cl. 117—11)

This invention relates to flexible decorative surface coverings and particularly to such coverings having a foam layer of composition material and to a method for producing such coverings.

Printed products adaptable as decorative and protective coverings for floors, walls and the like have been available on the market for many years. The technique of printing on a flexible backing sheet with an oleoresinous enamel paint decoration has been used commercially for at least 40 years to produce products commonly referred to as printed felt base. Such products can be readily manufactured in a variety of attractive designs and are relatively low in cost.

Printed felt base has a hard, smooth decorative wearing surface formed of dried oleoresinous enamel paint. Although this product is easily cleaned because of its smooth hard surface, it tends to cause excessive noise from foot traffic. In addition, the hard surface can cause fatigue to those who must stand on it for long periods of time. The comfort and noise production of conventional printed felt base is somewhat better than floors of wood and stone due to the cushioning characteristics of the felt backing. The improvement, however, is only slight since the felt layer is very thin. Also such products lack any appreciable resistance to the flow of heat with the result that printed felt base covered floors tend to be cold, an effect augmented by the smooth and glossy wearing surface.

Rubber resilient floor coverings such as 0.125 inch thick tile are available on the market which are quiet and comfortable under foot. Rubber tile, however, is expensive and tends to be cool due to its thermal conductivity.

Efforts have been directed toward improving the resilience of smooth surface floor coverings such as printed felt base. Products with improved resilience can be made by the application of a thin layer of foam rubber to the back of the surface covering. Although this does improve the resilient properties of the products, there are certain disadvantages. Foam rubber is subjected to deterioration and chemical attack, particularly if it is installed upon a concrete floor. The resulting breakdown of the cell structure causes the product to lose its resilience. Also, where products are to be adhesively bonded to a surface during installation, the adhesive can become partially absorbed into the foam cell structure with a loss of resilience.

A major source of competition for smooth surface floor coverings is from woven or tufted soft surface carpeting. Carpeting is not only soft and comfortable under foot but also has a three-dimensional textured appearance which is particularly attractive in certain areas in the home. Soft surface carpeting, although highly attractive, has a serious disadvantage in that it readily soils and, once soiled, is difficult to clean.

Recently a product was discovered which incorporates the desirable characteristics of both soft and smooth surface coverings. In United States patent application S.N. 691,883, filed on October 23, 1957, by Robert K. Petry, entitled "Decorative Plastic Surface Covering and Process Therefor," there is disclosed a product having the desirable textured surface and resiliency of soft surface coverings such as tufted carpet while still retaining the unitary readily cleanable surface of hard surface floor coverings. This product is produced by printing a design on a textured backing, such as an embossed flooring felt, with a thermoplastic resinous composition containing a foaming agent and thereafter heating the printed design to fuse the resinous composition and foam the thermoplastic composition. The result of this procedure is a product closely simulating woven or tufted carpet having a three-dimensional surface appearance caused by the embossing, a resilient character caused by the foam and having a unitary easily cleaned surface. The present invention represents an improvement of this product. In this prior process the best effect is gained by an overall embossing of the back. It is very difficult by this procedure to produce a product wherein the embossed design corresponds directly with a regional effect created by the printed decoration. In order to accomplish this, it is necessary to have complete registry of the embossed base with the printing means. The present invention presents a simple and effective method for producing a product which has both the desired three-dimensional effect caused by the overall embossing while also having a multilevel structure which corresponds to the printed decoration. Such a product could, for example, simulate very closely the conventional woven sculptured rug.

An object of the invention is to produce a decorative surface covering characterized by excellent resilience and comfort under foot which has dual surface levels which correspond at least in part to its printed decoration. Another object of the invention is to provide a process for producing such a product in a simple and economical manner. Additional objects and the advantages of the invention will appear hereinafter.

In accordance with the invention, a surface covering having a textured three-dimensional decorated foamed surface having different surface levels in designated areas is produced by embossing or otherwise creating depressions in a backing material, printing distinct portions of a design upon the backing with two foamable thermoplastic resinous compositions containing substantially different amounts of foaming agent and heating to fuse and foam the resinous composition thereby forming an overall three-dimensional appearance caused by the textured backing and different surface levels caused by the varying amounts of foaming agent in the composition.

The invention will be better understood from the following detailed description when read in conjunction with the accompanying drawings wherein Figure 1 is a schematic representation of a method of producing a surface covering in accordance with the present invention, Figure 2 is an enlarged cross-sectional view of a textured flexible backing for use in preparing products of the invention, Figure 3 is an enlarged cross-sectional view of the backing of Figure 2 with a decorative composition applied thereto, Figure 4 is an enlarged cross-sectional view of the final three-dimensional printed surface covering, and Figure 5 is a portion of the surface of the three-dimensional printed surface covering.

A web of backing material 11 such as felted fiber passes through an embossing unit comprising an upper embossed roll 12 bearing a plurality of spaced protuberances 13 which are provided in the pattern to be embossed in the backing sheet. In the embossing unit, the opposite side of the felt web is contacted by a back up roll 14. The embossed felt web 15 bearing depressed portions 17 produced by contact with the embossing roll passes beneath a doctor blade 18 which allows a uniform layer of resinous composition 19 containing a foaming agent to be applied to the surface of the web. The coating is sufficient to fill the depressions 17 to give the web 15 a substantially smooth surface. The coated web passes to a standard block printing machine used in the printed felt base industry. The block printing machine consists of a bed 21 which extends its entire length and width. At each of the opposite sides of the bed is an endless belt 22 provided with pins 25 which project vertically from the belt at spaced points throughout its length. The belt 22 passes around and is driven by wheels 23, 24. The embossed web of backing material 15 passes from the coating operation and is engaged by the pins 25 which pierce the web and advance it along the machine. The block printing machine has a plurality of vertically reciprocable print blocks 26 which are provided with printing surfaces 27 cut in the form of the design to be printed. Associated with each print block is a paint pot 29 and a roller 30. When the print blocks are at rest at their maximum height, the paint pot with associated roller moves beneath the block thereby transferring a film of printing composition to the printing surface of the block. Through conventional operation of the block printing machine a film of printing composition 28 is applied to the supper surface of the web of backing material. Sections of the design are printed with a resinous composition containing larger amounts of foaming agent than other sections of the design. The printed web passes through a hot air oven 31 in which the resinous composition is fused and foamed, thereby producing a decorative foamed layer 36 bearing an overall texture 35 in reverse to the impressions in the web and having raised foamed portions 37 and lower foamed portions 38 which correspond to the printed areas having the different amounts of foaming agent in the printed resinous composition. The surface of the decorative foam layer thereby has a series of overall raised and depressed portions as well as the variations in height caused by the varying amounts of foaming agent. The product thus produced can be used in sheet form or can be cut up into tiles or in any other appropriate shapes. The process of the invention makes possible the formation of a product having in addition to the overall textured foam surface caused by the utilization of embossed backing material, but also a product having two or more distinct levels of foam corresponding with the printed design.

The embossed web while producing a textured surface alone has certain limitations in that the depth of the texture is limited by the depth of embossing. If it is desirable to have a smooth surface on the back of the product, it is necessary to limit the depth of embossing to no greater than the thickness of the felt or to laminate a smooth material to the back of the embossed felt. In addition, a great deal of control is required if it is desired to have the embossing in register with the printed decorative design. By utilizing the process of the invention the overall textured effect caused by the embossing can be complemented by two or more different levels of foam in register with sections of the design.

The operation of the block printing machine illustrated in Figure 1 is conventional and is similar to the operation of such a machine in the production of the conventional printed felt base surface coverings of the prior art. The motion of the web along the length of the machine is in a stepwise fashion controlled by the intermittent motion of wheels 23, 24. When the web is at rest, the printing blocks are depressed and deposit a film of printing composition upon the web. The blocks are then raised and the web advances a distance equal to the width of a print block. In a conventional block printing machine the printing blocks are 18 inches in width and are spaced 18 inches apart. The web, therefore, moves intermittently in 18 inch steps along the length of the machine. As the web advances with the print blocks raised, the paint pots move beneath the printing blocks depositing a fresh film of printing composition on the printing surfaces thereof. The operation is then repeated. There are as many printing blocks as there are individual colors desired in the finished design. Conventional block printing machines have spaces for up to 24 separate printing blocks so that designs of great complexity and diversity of color can be produced.

The backing web on which the decorative design is printed in accordance with the invention is preferably a flexible strong material which will remain part of the product although backing materials can be used which can be subsequently stripped from the final product. If the backing remains on the product, flexibility is important since the product is conventionally stored in closely wound rolls and must be capable of being rolled and unrolled without cracking or tearing. Strength is important in a backing in view of the strains to which the product is subjected when handled both during manufacture and immediately prior to installation.

The backing sheet must bear a texture in the form of depressed and raised portions in accordance with the particular three-dimensional overall effect desired in the finished product. The contrast between the depressed and raised portions should be of the order of at least 5 mils; that is, the depressed portions should lie at least 5 mils below the raised portions in the textured backing sheet. Where a backing naturally bearing a smooth surface is used this backing sheet can be embossed to produce the desired texture. Any of the conventional techniques of embossing such as flat bed or rotary embossing can be used. Where a backing sheet in its natural state already possesses the desired type and character of texture, no embossing is necessary. Coarse woven fabrics possess natural texture and when they are used as backings, the outline and effect of the weave is formed in the foam structure in the finished product. Where other types of three-dimensional effects are desired in the finished product it is preferable to use a natural smooth backing sheet which is embossed in the desired pattern. The embossing can be in any desired pattern, but the best appearance is created by a uniform overall embossing, for example, a series of evenly spaced depressions as illustrated in Figure 2 or more elaborate embossing, if such an effect is desired. The shape and position of the depressed areas in the backing will conform to the overall raised areas in the finished product. The deeper the embossing or texture in the backing, the greater will be the overall three-dimensional effect in the product.

Suitable backing sheets include those formed of flexible resinous compositions as well as sheets of woven fabric and impregnated felted fibers. Any of the thermoplastic or elastomer resinous compositions which can be calendered or pressed to form a flexible sheet can be used to form backing sheets which can be textured for use in the invention. Such resins as butadiene-styrene copolymer, polymerized chloroprene, polyvinyl chloride, polyvinyl acetate, vinyl chloride-vinyl acetate copolymer and the like can be compounded with plasticizers and fillers and sheeted to form a flexible sheet. In some cases, scrap and degraded resinous compositions can be salvaged by forming them into sheets which can be embossed and used as backing sheets in producing products in accordance with the invention.

Suitable backing sheets also include rough woven fabrics formed of such fibers as cotton, wool and various synthetic and mineral fibers. For use in the invention the weave must be sufficiently rough that the depressed portions of the weave lie at least 5 mils beneath the raised portions. Where loosely woven fabrics such as burlap are used, the fabric can be sized to prevent passage of the printing composition completely through the openings between the fibers.

It has been found that felted cellulosic or asbestos fibrous sheets impregnated with a water-proofing and strengthening saturant can be embossed or otherwise roughly textured to yield desirable backing sheets for the production of products in accordance with the invention since they are low in cost and yet are flexible and strong. The sources of cellulose can include cotton or other rags, wood pulp, paper boxes or mixtures thereof in any proportion. In addition, fillers such as wood flour can be used. A slurry of fibrous material in water is formed into a sheet using any of the techniques conventionally employed in the manufacture of paper. For example, sheet formation can take on a Fourdrinier or cylinder sheet formation can take place on a Fourdrinier or cylinder sheet forming machine. The fibrous sheet so prepared is then dried. In addition to cellulosic and asbestos, other fibers can be used including synthetic fibers and those of mineral and animal origin.

Felted fibrous sheets as produced by conventional sheet forming techniques are usually unsatisfactory for use as backings for surface covering products without impregnation due to poor strength and water resistance. Impregnation with a water-proofing and strengthening impregnant is required.

The particular impregnant chosen must not only be capable of imparting strength and water resistance to the sheet of felted fibers but must also meet other requirements as to its physical and chemical behavior at high temperatures. The printed composition applied to the backing in accordance with the invention must be heated to temperatures as high as 300 to 400° F. in order to fuse the resin and expand the composition into a foam. Thus, the impregnant chosen must be stable at these temperatures. The impregnant should be substantially free of any components which are volatile at these temperatures and its also must not soften to such an extent as to exude from the sheet. In addition, the saturant should not be subject to appreciable detrimental chemical changes such as oxidation.

The conventional impregnant used in the manufacture of printed felt base coverings of the prior art has been asphalt. Although asphalt is very low in cost, it is a highly thermoplastic substance and in general is too fluid at high temperatures for use as an impregnant for felt in the production of products in accordance with the invention. Asphalt saturated felt can only be used as a backing sheet in the invention where the level of impregnation is controlled not to exceed 115 percent by weight based on the weight of dry felt and where the surface on which the decorative composition is printed bears a plurality of sealing coats of paint comprising such binders as butadiene-styrene copolymer, vinylidene chloride copolymers and the like.

There are other saturants which can be used in place of asphalt to impart strength and water resistance to felt and which can withstand temperatures of 350° F. without the necessity of providing special sealing coats. Fibrous sheets impregnated with resinous materials are particularly suitable for use as backing sheets in the invention. Suitable resins include vinyl resins, such as polyvinyl chloride, mixtures of these with each other, copolymers with each other and with other monomers copolymerizable therewith, polymerized acrylic and methacrylic acids and their polymerized derivatives polyethylene, polystyrene, butadiene-styrene copolymer, butadiene-acrylonitrile copolymer, natural rubber, polymerized chloroprene and the like. Thermosetting resins which under the influence of heat cure by polymerizing and cross linking can also be used as impregnants. Such resins as phenolic resins, polyesters, oleoresins such as drying oils and the like, isocyanates, polyurethanes and the like are suitable.

Such resins can be incorporated into a felted fibrous sheet by impregnation of the finished sheet with an emulsion or solution of the resin followed by drying of the sheet to remove the solvent. Alternately, the resin can be added in fine particles to the fiber furnish prior to sheet formation either as solid particles of resin or as an emulsion in water or other emulsifying vehicle.

In accordance with the invention, a decorative design is applied to the textured backing by printing with fluid foamable printing compositions having different amounts of foaming agent. Suitable printing compositions comprise a thermoplastic resinous binder and a foaming agent which is decomposed by heat to yield a foam producing gas, all dispersed in a liquid medium. The resinous binder must be one that is coalesced or fused into a continuous film by the application of heat. The vinyl resins are preferred particularly polyvinyl chloride and its copolymers, because of their high wear resistance. Other thermoplastic resins which can be mentioned are polymers and copolymers of acrylic acid and methacrylic acid and their derivatives, polystyrene, polymerized methyl styrene, polybutadiene and the like. The dispersion medium can be water in the case of an aqueous latex printing fluid, but is preferably a fluid plasticizer for the thermoplastic resin used. Such a dispersion of resin in a plasticizer is conventionally termed a plastisol.

A plastisol can be defined as a thermoplastic resin in the form of fine particles thoroughly and uniformly dispersed in plasticizer in the presence of small amounts of pigments and stabilizers. A plastisol has appreciable fluidity at normal room temperatures but is converted by heat into a flexible, tough thermoplastic mass. This ultimate result is brought about by the process of fusion wherein the resin becomes plasticized and solvated by the plasticizer.

Polymers of vinyl chloride have been found to be particularly effective in formulating plastisol printing compositions for use in the invention. The vinyl chloride polymers can either be simple, unmixed homopolymers of vinyl chloride or copolymers thereof in which the essential polymeric structure of polyvinyl chloride is interspersed at intervals with the residues of other ethylenically unsaturated compounds copolymerized therewith. The essential properties of the polymeric structure of polyvinyl chloride will be retained if not more than 40 percent of the extraneous comonomer is copolymerized therein. Suitable extraneous comonomers include, for instance, vinyl esters, such as vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrols and the like; acrylic acid and its derivatives such as ethyl acrylate, methyl methacrylate, ethyl methacrylate, ethyl chloroacrylate, acrylonitrile, methacrylonitrile, methacrylonitrile, diethyl maleate, diethyl fumarate and the like; vinylidene compounds on the order of vinylidene chloride, vinylidene bromide, vinylidene fluorochloride and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3, piperylene, divinyl ketone and the like.

Resins adaptable for use in formulating vinyl chloride plastisols are commonly referred to as dispersion grade resins. Such resins are available having particle sizes of from 0.02 to about 2 microns in contrast to calender grade vinylchloride resins which are available in particles ranging up to 35 microns in size. Dispersion grade resins are usually of higher molecular weight than calender grade resins and have particle surfaces of a hard, horny nature.

Polymers of vinyl chloride having specific viscosities above about 0.17 and preferably between 0.17 and 0.31 as measured in a solution of 0.2 gram of resin in 100 milliliters of nitrobenzene at 20° C. are particularly effective.

In the determination of specific viscosities the sample of resin in nitrobenzene solution maintained at a temperature of 20° C. is allowed to flow between two calibrated marks in a pipette and time required is recorded. This time is compared with the time required for a control of pure nitrobenzene solvent to pass between the same two marks, also at a temperature of 20° C. The specific viscosity is determined as the sample flow time divided by the control flow time, minus 1. The specific viscosity is an effective measure of relative molecular weight of the polymer, the higher the specific viscosity the higher being the molecular weight.

In the formulation of plastisol printing compositions for use in the invention, the fine particle size resin is uniformly dispersed in a mass of fluid plasticizer. The fluidity of plastisols is influenced in part by the particular resin selected but is also a function of the ratio of plasticizer to resin. Plastisols become less fluid as the ratio of plasticizer to resin is reduced. Plastisol printing compositions for use in the invention contain from about 50 to about 150 parts plasticizer per 100 parts resin with a range of 60 to 100 parts plasticizer per 100 parts resin being particularly effective. The viscosity of plastisol printing compositions can also be reduced by the addition of small amounts of a volatile diluent not exceeding about 10 parts per 100 parts resin. Useful diluents include benzene, toluene, petroleum solvents such as V.M. and P naphtha (boiling range—190–275° F.) and the like.

Suitable printing compositions have a viscosity at 25° C. of from about 200 to about 25,000 centipoises as measured with a Brookfield viscometer using a Number 6 spindle at 10 r.p.m. For printing by the flat bed technique as illustrated in the drawings, a viscosity range of about 500 to about 5,000 centipoises is desirable with a range of 1,000 to 3,500 centipoises being particularly effective.

The selection of the plasticizer is important in determining the strength and flexibility of the wearing surface of the printed surface covering and also in influencing the viscosity and viscosity stability of the printing fluid and its foaming characteristics. Esters of straight and branched chain alcohols with aliphatic acids impart low viscosity and good viscosity stability to a plastisol. Typical plasticizers of this type include dibutyl sebacate, dioctyl, sebacate, dioctyl adipate, didecyl adipate, dioctyl azelate, triethylene glycol di(2-ethylhexanoate), diethylene glycol dipelargonate, triethylene glycol dicaprylate and the like. Plasticizers of the aromatic type, such as esters of aliphatic alcohols and aromatic acids or aromatic alcohols and aliphatic acids or aromatic alcohols and aromatic acids are desirable in that they impart good foaming characteristics to a plastisol, although the use of highly aromatic plasticizers is limited by their tendency to yield plastisols of high viscosity. Typical plasticizers of this type include dibutyl phthalate, dicapryl phthalate, dioctyl phthalate, dibutoxy ethyl phthalate, dipropylene glycol dibenzoate, butyl benzyl sebacate, butyl benzyl phthalate, dibenzyl sebacate, dibenzyl phthalate and the like. Other types of plasticizers, such as esters of inorganic acids, including tricresyl phosphate, octyl diphenyl phosphate and the like, alkyd derivatives of rosin, chlorinated paraffine, high molecular weight hydrocarbon condensates and the like can also be used. The plasticizer or blend of plasticizers is chosen to yield a plastisol of the desired viscosity and foaming characteristics. In addition, the plasticizer should have a low vapor pressure at the temperatures required to fuse the resin. A vapor pressure of 2 millimeters of mercury or less at 400° F. is satisfactory.

Minor amounts of stabilizers which are incorporated to reduce the effects of degradation by light and heat are present in the composition. Suitable light stabilizers include resorcinol disalicylate, resorcinol dibenzoate, phenyl phthalate, phenyl benzoate, o-tolyl benzoate, eugenol, guaiacol, o-nitrophenol, o-nitraniline, triethylene glycol salicylate, and organic phosphates and other complexes of such metals as barium, cadmium, strontium, lead, tin and the like. Suitable heat stabilizers include sulfides and sulfites of aluminum, silver, calcium, cadmium, magnesium, cerium, sodium, strontium and the like, glycerine, leucine, alanine, o- and o-amino benzoic and sulfanilic acids, hexamethylene tetramine, weak acid radicals including oleates, ricinoleates, abietates, salicylates and the like. Normally, the printing fluid contains from 0.5 to 5 parts stabilizer per 100 parts resin. The particular stabilizers chosen should not impart excessive viscosity to the printing composition.

The printing compositions contain pigments in accordance with the particular color desired. Where a multicolored decorative effect is created in accordance with the invention, separate batches of printing fluid for each of the colors desired are needed. Any of the organic and inorganic pigments well known in the art for pigmenting resinous compositions can be used. Normally, from 0.5 to 5 parts pigments per 100 parts resin are used.

The foamable plastisol compositions contain in addition, an effective amount of a foaming or blowing agent. The larger the amount of foaming agent within practical limits used the greater is the expansion of the foam. Foam densities of from 10 percent to 50 percent of the density of the unblown plastisol can be readily attained. Such results are attainable with from about 1 to about 20 parts foaming agent per 100 parts resin with from 2 to about 10 parts foaming agent per 100 parts resin being particularly effective for the production of foams of a density which are most desirable for use in producing surface coverings in accordance with the invention.

Complex organic compounds which when heated decompose to yield an inert gas and have residues which are compatible with the resin used in the plastisol are preferred as foaming agents. Such materials have the property of decomposition over a narrow temperature range which is particularly desirable for obtaining a good foam structure. Compounds having the >N—N< and —N=N— linkages decompose at elevated temperatures to yield an inert gas high in nitrogen. Typical compounds include substituted nitroso compounds, substituted hydrazides, substituted azo compounds and the like, such as are tabulated below:

| Foaming Agent | Decomposition Temperature, °F. |
| --- | --- |
| p,p'-oxybis-(benzenesulfonyl hydrazide) | 300–320 |
| N,N'-dimethyl-N,N'-dinitroso terephthalamide | 200–220 |
| dinitrosopentamethylenetetramine | 355–375 |
| azodiformamide | 370–390 |

Foaming agents for use in the invention must be decomposed an effective amount at a temperature below the decomposition temperature of the resin used. Therefore, in the case of plastisols formulated with the preferred vinyl chloride polymers, a foaming agent decomposing below 450° F. must be used. The minimum initial decomposition temperature must be sufficiently high that no substantial amount of premature gas evolution occurs during plastisol formulation and subsequent printing. Such premature gas evolution renders printing difficult. In addition, the minimum decomposition temperature of the foaming agent must be at a temperature where the printed film has sufficient body to retain the bubbles of evolved gas. In general, vinyl chloride polymer plastisols attain body through partial gelation when heated to about 200° F. Thus the minimum initial decomposition temperature should be about 200° F. or higher.

The use of foaming agents which decompose above the fusion temperature of the polymer is particularly effective. A layer of resinous foam has heat insulating properties with the result that fusion of a prefoamed layer can be difficult. Thus, particularly effective foaming agents are those which decompose over a temperature range from the polymer fusion temperature up to the decomposition temperature of the polymer. Azodiformamide is a particularly effective foaming agent of this type.

When the technique of block printing is used to produce the decorative design, a film of decorative composition of appreciable thickness is applied to the textured surfaced backing material. It is desirable for the decorative composition to be printed with uniform thickness since this simplifies operation and adjustment of the machine. Somewhat the same effect of multilayer foam can be obtained if instead of varying the amount of foaming agent the thickness of each portion of decorative composition is varied. The difference in levels which can be obtained in this manner is substantially limited since a ratio of 2 to 1 would normally be the greatest difference obtainable. A ratio of level difference as high as 6 to 1 can be obtained by varying the amounts of foaming agent. Printed films of 5 to 10 mils in thickness can be readily applied by block printing. When a film of this thickness is expanded and foamed by decomposition of the foaming agent in the composition, a decorative expanded foamed layer having an average thickness of 10 to 100 mils is produced. This is of sufficient thickness to provide satisfactory resilience and cushion effects when the product is installed as a floor covering. As an illustration of the product obtained in accordance with the invention, decorative element 37 in Figure 5 can be 40 mils thick while decorative element 38 can be 20 mils thick with an overall depth of 10 mils corresponding to the raised areas of the overall embossing. The variation in the thickness of the foam which can be obtained with various amounts of foaming agent is illustrated in the following table:

| Parts Azodiformamide per 100 parts resin | Blow Ratio | Foam Density (lbs. per cu. ft.) |
|---|---|---|
| 0.0 | 1/1 | 80 |
| 0.1 | 1.33/1 | 60 |
| 0.5 | 2/1 | 40 |
| 1.0 | 3/1 | 27 |
| 2.0 | 4.5/1 | 17.5 |
| 3.0 | 6.5/1 | 12.3 |
| 5.0 | 9.3/1 | 8.6 |
| 10.0 | 10.7/1 | 7.5 |

The description of the invention with respect to application of the foamable composition by means of a block printing machine is not intended to restrict the invention to this method of printing. Other techniques of printing such as rotary or silk screen printing can be used. For maximum resilience in the finished product it is desirable that the printed film be of sufficient thickness that it can be expanded and foamed into a layer of appreciable thickness. Where printed films of less than 1 mil in thickness are applied, the resulting expanded film will normally be too thin to possess any appreciable properties of resilience.

After the application of the decorative foamable layer the composition must be heated to a temperature sufficient to fuse the resin and decompose the foaming agent. The temperature of the entire mass of composition upon the backing must attain the fusion temperature of the resin in order that a product of satisfactory strength can be attained. In addition, the entire mass of foamable composition must be heated to a point where the foaming agent is decomposed. Where a preferred high temperature foaming agent is used, foaming does not occur until the resinous composition has been completely fused.

If volatile diluents are used to reduce the viscosity of the printing composition, care must be taken that they are essentially completely removed from the film prior to fusion and blowing. If such precautions are not taken, poor cell structure and blister formation can result. Such removal can be accomplished by heating the printed film at a temperature substantially below the fusion temperature and minimum decomposition temperature of the foaming agent for sufficient time to remove the volatile material. For example, if 5 percent of naphtha (boiling range 190–275°) is used, heating at 200° F. for 5 to 10 minutes will remove sufficient material so that fusion and blowing at 400° F. can be accomplished with good cell structure and freedom from blisters.

Heating in order to effect fusion and foaming can be brought about in a forced hot air oven as shown in the drawing or other types of heating can be used. For example, the product can be passed beneath radiant heating elements; alternately, dielectric heating can be used.

The expansion of the printed film due to foaming yields an overall three-dimensional textured effect which duplicates in reverse the texture in the backing. That is, depressions in the backing appear as raised areas of foam. The size of the raised areas in the foamed product depends on the depth of the depressed areas in the backing and the amount of expansion in the foaming process. The decorative design is unimpaired by the foaming in that the foamed surface accurately reproduces the printed pattern applied. The overall decorative effect is enhanced by the multilevels of foam which correspond directly with the amount of foaming agent utilized in each.

In order that the texture of the backing be accurately reproduced in the foamed product, it is important that the printed film flow into and fill all the depressions in the textured backing and become completely level so as to have a smooth surface prior to the foaming step. Where relatively thick base sheets are embossed to a substantial depth there is a possibility that satisfactory leveling of the printed film prior to foaming will not occur. With such a result the textured appearance of the final product would not accurately reproduce the pattern of the embossing. As an example, felt sheets having a thickness of 0.045 inch can be embossed to produce depressed areas having a depth of as much as 0.035 inch. In such cases improved fidelity of reproduction of the embossing in the foamed product can be attained by coating the embossed base sheet with a foamable resinous composition prior to the printing with the printing compositions. Doctor blade coating is a particularly effective method for such a coating operation and insures that all the depressions in the embossed felt become completely filled with foamable composition. The coating composition used can be pigmented in a neutral color which is compatible with the general color tones desired in the finished product. After the coating step the printing composition can be applied by any of the conventional techniques of printing as already disclosed to yield a smooth uniform surface on the base prior to the foaming step. The sheet can then be passed through the foaming and fusion oven to expand the foam and form the decorative textured finished product.

The foamed and fused product after leaving the heating oven is permitted to cool. Cooling is particularly important since any premature handling of the product immediately after foaming might cause partial collapse and distortion of the foam structure. Cooling can be brought about by mere exposure of the product to the atmosphere, thus, the speed of motion of the backing along the processing apparatus and the spacing between the fusion oven and the end of the apparatus can be adjusted so the product is given sufficient time to cool. Alternately, cooling can be accelerated by blowing jets of cooled air upon the fused and foamed composition or by means of fine sprays of water upon the fused and foamed composition.

In order to permit ease of cleaning of the product after installation it is sometimes preferred to have a clear film of soil resistant composition on the decorative layer. The film of soil resistant composition can be formulated as a plastisol or organosol of a thermoplastic resin. Preferably a vinyl chloride polymer resin as described above in connection with the foamable plastisol layer is used in order to insure maximum compatibility with the decorative and foamed compositions applied to the backing. Acrylic resins have also proved particularly effective. Plastisols useful as wear layers comprise from about 50 to 150 parts plasticizer per 100 parts resin. Organosols are similar to plastisols in that the resin is present in the form of fine unplasticized particles uniformly dispersed in a fluid mass. The dispersion medium in organosols comprises in addition to plasticizer a volatile organic solvent, such as xylene, toluene, cyclohexanone, methyl ethyl ketone, methyl isobutyl ketone, and the like. Organosol compositions useful in the production of soil resistant layers comprise from about 20 to about 150 parts plasticizer and about 1 to about 80 parts solvent per 100 parts resin.

Suitable soil resistant compositions are formulated in the conventional manner used in the formulation of plastisols and organosols. Since the printed decorative layer appears beneath the soil resistant composition layer it is essential that this upper layer be transparent or translucent; therefore, it is normally formulated without pigments and fillers and thus comprises fine particles of resins dispersed in compatible plasticizer in the presence of suitable heat and light stabilizers plus the addition of voltatile organic solvent in the case of an organosol. After the layer of soil resistant composition is applied to the decorative surface of the foamed product the sheet is subject to heat in order to fuse the resin in the soil resistant layer and firmly bond it to the decorative foamed layer beneath. As an alternate procedure, the wear coating can be applied prior to decomposing the foaming agent.

After being cooled, the product is withdrawn from the processing apparatus. It can be used in the form of a sheet as produced or can be cut into tiles or other appropriate shapes depending on the particular use to which the product is to be put. Products produced in accordance with the invention have the characteristics of excellent resilience under foot in view of the foam layer which is at or extremely near the surface of the product. They are also characterized by having a marked three-dimensional textured appearance conforming to the texture of the backing. Still further, the products of the invention have good heat insulating properties by virtue of the layer of foam composition and thus are warmer in winter and cooler in summer than conventional smooth surface floor coverings of the prior art.

The following examples are given for purpose of illustration:

Example I

The following ingredients in the proportions indicated were ground on a three-roll mill:

| | Parts |
|---|---|
| Polyvinyl chloride (dispersion grade) | 100 |
| Petroleum hydrocarbon condensate [1] | 18 |
| Butyl benzyl phthalate | 52 |
| Finely divided filler | 3 |
| Stabilizers | 4 |
| Azodiformamide foaming agent | 3.5 |

[1] Conoco 300—Continental Oil Company, Ponca City, Oklahoma.

The plastisol had a viscosity of 4,000 centipoises as measured with a Brookfield viscometer using a No. 6 spindle at 10 r.p.m.

Example II

The following ingredients were ground on a three-roll mill:

| | Parts |
|---|---|
| Polyvinyl chloride (dispersion grade) | 100 |
| Petroleum hydrocarbon condensate [1] | 18 |
| Butyl benzyl phthalate | 52 |
| Finely divided filler | 3 |
| Stabilizers | 4 |
| Azodiformamide foaming agent | 1 |
| V. M. and P. naptha, boiling range 190 to 275° F. | 5 |

[1] Conoco 300—Continental Oil Company, Ponca City, Oklahoma.

The plastisol had a viscosity of 2,000 centipoises as measured with a Brookfield viscometer using a No. 6 spindle at 10 r.p.m. It was suitable for printing by the flat bed method.

Example III

The following ingredients in the proportions indicated were ground on a three-roll mill:

| | Parts |
|---|---|
| Polyvinyl chloride (dispersion grade) | 100 |
| Didecyl phthalate | 100 |
| Stabilizers | 5 |
| Wetting agent | 3.5 |
| N,N'-dimethyl-N,N'-dinitroso terephthalamide foaming agent | 5 |

The plastisol had a viscosity of 2,000 centipoises as measured with a Brookfield viscometer using a No. 6 spindle at 10 r.p.m. It was suitable for printing by the flat bed method.

Example IV

The following ingredients in the proportions indicated were ground on a three-roll mill:

| | Parts |
|---|---|
| Polyvinyl chloride (dispersion grade) | 100 |
| Didecyl phthalate | 60 |
| Didecyl adipate | 25 |
| Stabilizer | 5 |
| Wetting agent | 3.5 |
| N,N'-dimethyl-N,N'-dinitroso terephthalamide foaming agent | 5 |

The plastisol had a viscosity of 1,350 centipoises as measured with a Brookfield viscometer using a No. 6 spindle at 10 r.p.m. It was suitable for printing by the flat bed method.

Example V

The following ingredients in the proportions indicated were ground on a three-roll mill:

| | Parts |
|---|---|
| Polyvinyl chloride (dispersion grade) | 100 |
| Petroleum hydrocarbon condensate [1] | 18 |
| Butyl benzyl phthalate | 52 |
| Finely divided filler | 3 |
| Stabilizers | 4 |
| Azodiformamide foaming agent | 4.5 |

[1] Conoco 300—Continental Oil Company, Ponca City, Oklahoma.

The plastisol had a viscosity of 4,000 centipoises as measured with a Brookfield viscometer using a No. 6 spindle at 10 r.p.m. It was suitable for printing by the flat bed method.

Example VI

An organosol was formulated by grinding the following ingredients on a three-roll mill:

| | Parts |
|---|---|
| Polyvinyl chloride (dispersion grade) | 100 |
| Dioctyl phthalate | 15 |
| Tricresyl phosphate | 15 |
| Petroleum mineral spirits | 20 |
| Methylethyl ketone | 2 |
| Stabilizers | 5 |

Dispersion grade vinyl resin was used in the preparation of the organosol. The composition can be used as produced as a clear soil resistant layer in the production of products in accordance with the invention.

Example VII

A clear soil resistant coating was prepared having the following composition:

| | Parts |
|---|---|
| Acryloid A101 [1] (40% solids in methylethylketone) | 5.0 |
| VYNS [2] resin (10% solids in methylethylketone) | 20.0 |
| Butyl benzyl phthalate | 1.2 |
| Barium cadmium stabilizer | 0.08 |
| Xylene | 8.72 |

[1] An acrylic resin manufactured by Rohm & Haas Co., Philadelphia, Pa.
[2] A copolymer of vinylchloride (90%) and vinylacetate (10%) manufactured by Union Carbide & Carbon Co., New York, N.Y.

The composition was diluted to spray viscosity with the following solvent blend:

| | Parts |
|---|---|
| Methylethyl ketone | 70 |
| Toluene | 5 |
| Xylene | 25 |

Example VIII

A clear soil resistant coating was prepared having the following composition:

| | Parts |
|---|---|
| Acryloid A21 [1] (20% solids in 90/10 toluene-butanol) | 6.7 |
| VYHH [2] resin | 20.0 |
| Paraplex, G50 [3] | 0.6 |
| Toluene/2-nitropropane (70/30) | 9.1 |

[1] An acrylic resin manufactured by Rohm & Haas Co., Philadelphia, Pa.
[2] A copolymer of vinylchloride (87%) and vinylacetate (13%) manufactured by Union Carbide & Carbon Co.
[3] Polyester plasticizer manufactured by Rohm & Haas Co., Philadelphia, Pa.

Example IX

A clear soil resistant coating was prepared having the following composition:

| | Parts |
|---|---|
| Polyvinyl chloride resin (dispersion grade in 95% tetrahydrofuran) | 2000 parts. |
| Epoxidized soya oil | 5 parts. |
| Flatting pigment (15% in methylethylketone) | 33 parts. |
| Cyclohexanol | Dilute to spray viscosity. |

Example X

A sheet of felted cellulose fibers (.045 inch thick) was produced containing 5 percent by weight of the fibers of polyvinyl acetate dispersed in fine particulate form at junctions of fibers within the sheet and uniformly impregnated with 35 percent by weight of the fibers of a petroleum resin having a softening point of 120° F. The sheet was embossed to a depth of 0.020 inch in a plurality of evenly spaced depressions. The foamable plastisol composition of Example II was prepared in three separate batches, each pigmented a different color. The foamable plastisol composition of Example I was prepared having a fourth color. These colored compositions were used as printing compositions in printing a four-color pattern by conventional block printing technique on a surface of the felt sheet. Prior to printing a film of foamable composition was doctored onto the sheet in sufficient quantities to fill the embossed impression. A film composed of the four-colored compositions, having a thickness of 10 mils, was printed and leveled to fill the depressions and yield a smooth surface. The sheet was then passed through an oven maintained at 400° F. with a residence time of three minutes, thereby fusing the resin and expanding and foaming the composition to produce a foamed product. The foamable compositions expanded to yield a product having a foam thickness averaging about 60 mils at the point of application of the plastisol of Example I and about 30 mils over the remaining portion of the product. A plurality of raised areas conforming in location to the embossed depressions in the backing was over the entire product. The product has a four color block-printed design with a three-dimensional textured appearance and the presence of the foam composition results in a soft and resilient feel to the product under foot.

Example XI

To the decorative surface of product of Example X was sprayed a three-mil thick layer of the clear organosol of Example VI and the sheet was again passed through the 400° F. oven to fuse the organosol. The resulting clear soil resistant layer failed to detract from the resilience and appearance of the product but rendered it more easily cleaned and resistant to soiling when the product was subjected to foot traffic.

Any departure from the foregoing description which conforms to the present invention is intended to be included within the scope of the claims.

What is claimed is:

1. In the method of producing a decorative foam layer surface covering having a textured surface comprising printing a multicolored decorative design on a flexible sheet with liquid foamable thermoplastic resinous compositions containing an effective amount of foaming agent, said sheet having a surface with a plurality of areas depressed beneath said surface, and heating said printed composition to fuse said composition and decompose said foaming agent thereby expanding the composition to create said textured decorative foam surface which bears a plurality of raised areas which conform in shape and position to the depressed areas in said sheet surface, the improvement which comprises utilizing as said foamable resinous composition at least two such compositions containing substantially different amounts of foaming agent, each of said compositions forming a different portion of said printed design.

2. The method according to claim 1, wherein said foamable thermoplastic resinous composition has a viscosity between 200 and 25,000 centipoises at 20° C.

3. The method according to claim 2 wherein said foamable thermoplastic resinous composition is a foamable plastisol of vinyl chloride polymer comprising 50 to 150 parts plasticizer per 100 parts vinyl chloride polymer.

4. In the method of producing a decorative surface covering having a textured surface comprising printing upon an embossed surface of an impregnated felted fibrous sheet with a foamable vinyl chloride polymer plastisol composition to form a multicolored decorative design, said composition having a viscosity between 200 and 25,000 centipoises at 25° C. and comprising 50 to 150 parts plasticizer per 100 parts of vinyl chloride polymer and an effective amount of a foaming agent which can be decomposed by heating to a temperature of less than about 450° F., said resinous composition completely covering said embossed surface and filling the depressions therein, and heating said printed composition to a temperature sufficient to fuse said vinyl chloride polymer and to decompose said foaming agent, thereby expanding said composition to create a three-dimensional textured decorative foamed surface which bears a plurality of raised areas in said embossed surface of said felted fibrous sheet, the improvement which comprises utilizing as said foamable composition at least two such compositions containing substantially different amounts of foaming agent, each of said compositions forming a different portion of said printed design.

5. The method according to claim 4 wherein said vinyl chloride polymer has a specific viscosity of between about 0.17 to about 0.31.

6. The method according to claim 4 wherein said foaming agent has a minimum initial decomposition temperature of at least about 200° F.

7. In the method of producing a decorative surface covering having a textured surface comprising embossing a surface of a sheet of felted fibers impregnated with a moisture proofing and strengthening impregnant to create a plurality of areas depressed at least 5 mils beneath said surface, printing upon said surface with a vinyl chloride polymer plastisol composition to form a multicolored decorative design, said plastisol composition having a viscosity between 500 and 5,000 centipoises at 25° C. and comprising 50 to 150 parts plasticizer and about 1 to about 20 parts foaming agent per 100 parts vinyl chloride polymer, said foaming agent being decomposed by heating at a temperature less than about 450° F. and heating said composition layer printed on said embossed surface to fuse said composition and decompose said foaming agent thereby expanding and foaming said printed composition layer to create a decorative textured foamed surface which bears a plurality of raised areas which conform in shape and position to said depressed areas in said embossed surface of said sheet, the improvement which comprises utilizing as said foamable composition at least two such compositions containing substantially different amounts of foaming agent, each of said compositions forming a different portion of said printed design.

8. The method according to claim 7 wherein said vinyl chloride polymer has a specific viscosity between about 0.17 and about 0.31.

9. In the method of producing a decorative surface covering having a textured surface comprising block printing a design with a foamable vinyl chloride polymer plastisol composition upon a surface of a flexible sheet having a plurality of areas depressed at least 5 mils beneath said surface thereby completely filling said depressed areas and covering said surface with a smooth printed layer having a thickness of about 5 to about 10 mils, said composition having a viscosity between 1,000 and 3,500 centipoises at 25° C. and comprising 60 to 100 parts plasticizer and 2 to 10 parts foaming agent per 100 parts vinyl chloride polymer, said foaming agent having a minimum initial decomposition temperature of at least about 200° F. and being decomposed by heating to a temperature of less than about 450° F., said vinyl chloride polymer having a specific viscosity of about 0.17 to about 0.31, and heating said composition layer printed upon said embossed surface to a temperature sufficient to fuse said vinyl chloride polymer and to decompose said foaming agent thereby expanding said printed composition layer to create a decorative textured foamed surface which bears a plurality of raised areas which conform in character and spacing to said depressed areas in said surface of said sheet, the improvement which comprises utilizing said foamable composition at least two such compositions containing substantially different amounts of foaming agent, each of said compositions forming a different portion of said printed design.

10. The method according to claim 9 wherein said decorative textured foam surface has a thin, clear layer of soil resistant resinous composition bonded thereto.

11. The method according to claim 9 wherein said foaming agent has a minimum initial decomposition temperature of at least the fusion temperature of said vinyl chloride polymer.

12. The method according to claim 11 wherein said foaming agent is azodiformamide.

13. In the method of producing a decorative surface covering having a textured surface comprising printing a design with a foamable vinyl chloride polymer plastisol composition upon a surface of an impregnated felted fibrous sheet having a plurality of areas depressed at least 5 mils beneath said surface, said composition having a viscosity between 200 and 25,000 centipoises at 25° C. and comprising 50 to 150 parts plasticizer, up to 10 parts volatile diluent per 100 parts vinyl chloride polymer and an effective amount of a foaming agent which can be decomposed by heating to a temperature of less than about 450° F., heating said printed composition to a temperature below the fusion temperature of said polymer and below the minimum decomposition temperature of said foaming agent to substantially completely evaporate said volatile diluent and thereafter heating said printed composition to a temperature sufficient to fuse said polymer and to decompose said foaming agent thereby expanding and foaming said printed composition to create said decorative textured foamed surface which bears a plurality of raised portions which conform in shape and position to said depressed areas in said surface of said sheet, the improvement which comprises utilizing as said foamable composition at least two such compositions containing substantially different amounts of foaming agent, each of said compositions forming a different portion of said printed design.

14. A method of producing a decorative surface covering having a textured surface comprising coating a surface of a flexible sheet having a plurality of areas depressed beneath said surface with a first foamable vinyl chloride polymer plastisol composition to completely fill said depressed areas, printing a design upon said surface having said filled depressed areas with a second and third foamable vinyl chloride polymer plastisol composition to form a uniform design of about 5 to about 10 mils thickness over said surface, said plastisol compositions having viscosities between 200 and 25,000 centipoises at 25° C. and comprising 50 to 150 parts plasticizer and about 1 to about 20 parts foaming agent per 100 parts vinyl chloride polymer, and said second composition containing substantially more foaming agent than said third composition, said foaming agent being decomposed by heating to a temperature of less than about 450° F., and heating said compositions applied to said surface to a temperature sufficient to fuse said vinyl chloride polymer and to decompose said foaming agents in said compositions thereby expanding and foaming said compositions to create a decorative textured foamed surface which bears a plurality of raised areas which conform in shape and position to said depressed areas in said surface and which has different surface levels which conform to sections of said design.

15. The method according to claim 14 wherein the ratio of foaming agent to polymer in said first plastisol composition is greater than the ratio of foaming agent to polymer in said second and third plastisol compositions.

16. A method of producing a decorative surface covering having a textured surface comprising coating a surface of a flexible sheet having a plurality of areas depressed beneath said surface with a first foamable vinyl polymer composition to completely fill said depressed areas, printing a design upon said surface having said filled depressed areas with a second and third foamable vinyl composition to form a design over said surface having portions which are substantially thicker than other portions, said vinyl compositions comprising about 50 to about 150 parts of plasticizer and about 1 to about 20 parts of foaming agent for each 100 parts vinyl resin, and heating said composition applied to said surface to a temperature sufficient to fuse said vinyl resinous compositions and to decompose said foaming agent thereby expanding said vinyl compositions to create a decorative textured foam surface which bears a plurality of raised areas which conform in shape and position to said depressed areas, and which has different surface levels of foam vinyl composition which conform to sectionss of said design.

References Cited in the file of this patent
UNITED STATES PATENTS

| | | |
|---|---|---|
| 2,013,472 | McCarthy | Sept. 3, 1935 |
| 2,537,126 | Francis | Jan. 9, 1951 |
| 2,768,091 | Cubberly | Oct. 23, 1956 |
| 2,776,265 | Fuller | Jan. 1, 1957 |